United States Patent [19]
Pong et al.

[11] Patent Number: 5,413,368
[45] Date of Patent: May 9, 1995

[54] BICYCLE WITH TRAILING ARM WHEEL SUSPENSIONS

[75] Inventors: Alex Pong, Langley; Skooks Pong, Freeland, both of Wash.

[73] Assignee: Cannondale Corporation, Georgetown, Conn.

[21] Appl. No.: 122,142

[22] Filed: Sep. 16, 1993

[51] Int. Cl.⁶ .............................................. B62K 25/04
[52] U.S. Cl. ...................... 280/277; 280/284; 280/285; 280/276; 180/219; 180/227
[58] Field of Search ............... 280/281.1, 283, 284, 280/285, 286, 288, 274, 275, 276, 277, 279; 180/219, 227, 223, 222

[56] References Cited

U.S. PATENT DOCUMENTS

| | | | |
|---|---|---|---|
| 1,924,363 | 8/1933 | Kanai | 180/223 |
| 2,489,821 | 11/1949 | Ryder | 180/223 |
| 3,433,318 | 3/1969 | Packard | 180/227 X |
| 4,170,369 | 10/1979 | Strutman | 280/288 X |
| 4,659,097 | 4/1987 | Küpper et al. | 280/288 X |
| 4,742,884 | 5/1988 | Ishikawa | 180/227 X |
| 4,776,609 | 10/1988 | Pan et al. | 180/219 X |
| 4,809,802 | 3/1989 | Seino et al. | 180/227 X |
| 4,889,205 | 12/1989 | Yoshimi | 180/227 |
| 5,042,608 | 8/1991 | Horiike et al. | 180/219 |
| 5,072,961 | 12/1991 | Huppe | 280/284 X |
| 5,217,241 | 6/1993 | Girvin | 280/284 |
| 5,284,354 | 2/1994 | McWethy | 280/284 |

*Primary Examiner*—Mitchell J. Hill
*Assistant Examiner*—F. Zeender
*Attorney, Agent, or Firm*—Brumbaugh, Graves, Donohue & Raymond

[57] ABSTRACT

A bicycle comprises a wheel-supporting frame member, a swing arm mounted on the frame member to pivot about a pivot axis, and a wheel mounted on the pivot arm for rotation about a rotation axis spaced apart from, to the rear of and substantially below the pivot axis. The pivot axis is located relative to the rotation axis such that upward vertical displacements of the rotation axis relative to the pivot axis upon rotation of the swing arm from a neutral position are accompanied by substantial rearward horizontal displacements of the rotation axis relative to the pivot axis. In the case of a rear wheel suspension, the drive chain passes over an idler sheave, which is mounted for rotation on the rear wheel support member generally below the pivot axis with its circumferential support surface for the chain located such that a tangent to it is proximate to the pivot axis.

17 Claims, 7 Drawing Sheets

BICYCLE WITH TRAILING ARM WHEEL SUSPENSIONS

BACKGROUND OF THE INVENTION

Some mountain bikes have energy-absorbing suspensions. In the case of the front wheel, the suspension commonly includes an axially or pivotally acting energy-absorbing assembly that enables the front fork to move relative to the headset. Various forms of trailing arm suspensions are used for the rear wheel. In a typical rear suspension, as shown in FIG. 2, a structure 12 resembling the rear triangle of a conventional bike is pivotally attached to a frame portion 14 at a pivot axis 16 and is coupled to a frame portion 18 by an energy-absorbing and damping assembly 20.

Figure 3:
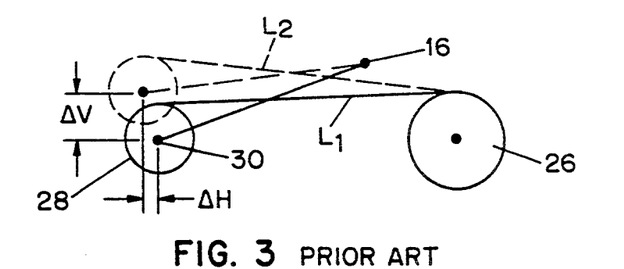
FIG. 3 is a diagrammatic view of the prior art suspension of FIG. 2.

FIG. 3 illustrates diagrammatically a characteristic of presently known suspensions, regardless of type, and regardless of whether they are for the front or rear wheels. The geometry of typical suspensions is such that the displacement of the wheel (and its rotation axis) when the wheel goes over a bump is primarily vertical. This means that the speed at which energy is absorbed by the suspension is short. For example, if the suspension could be designed to permit an infinite displacement horizontally upon encountering a bump, the time for absorbing the displacement would also be infinite—the wheel would never go over the bump. Increasing the time for energy absorption permits the capacity of the energy absorbing and damping components to be reduced, as a direct function of the time, and improves the efficiency of the suspension. The geometries of previously known bicycle suspensions is such that only small horizontal rearward displacements for any given vertical displacements can occur. Some suspensions produce forward horizontal displacements upon upward vertical displacements, which makes the time for response even shorter. Thus, the capacity of the energy-absorbing and damping components of previously known bicycle suspensions must be large to absorb and damp the energy rapidly.

Figure 2:
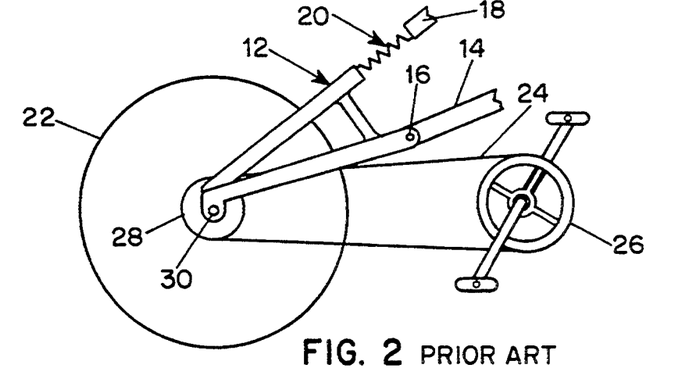
FIG. 2 is a schematic side elevational view of a typical, previously known bicycle rear suspension.

As shown schematically in FIG. 3, a suspension of the type shown in FIG. 2 permits the rear wheel 22 to be displaced upwardly through a distance $\Delta V$ when the bike traverses a bump. In most, if not all, rear suspensions of the type under consideration, the pulling distance of the chain 24 between the pedal crank sprocket 26 and the freewheel sprocket 28 changes from a length L1 to a length L2 (which may be either an increase or decrease, depending on the geometry) when the rotation axis 30 of the wheel displaces vertically. Thus, the suspension is coupled to the chain pull, in the sense that displacement of the suspension either drives or releases the driving sprocket wheel due to the change in pulling length. When the pulling length L2 is increased over L1 (pulling length of chain increases), the rider experiences an abrupt decrease of the pressure from the pedals to his legs as the increase in length is taken up by rotation of the driving sprocket wheel relative to the driven sprocket wheel, followed by a resumption of full pressure. When the pulling length of the chain decreases, the rider experiences an abrupt increase in the pressure from the pedals to his legs as the driven sprocket tends to drive the driving sprocket in reverse to accommodate the reduced pulling length, followed by a resumption of normal pressure. In either case, the changing forces on the legs as the pulling length changes is bothersome. Another way of looking at the way the suspension works is to recognize that the forces of the rider's legs on the driving sprocket wheel work in conjunction with the energy-absorbing and damping system of the suspension in responding to traversing bumps. Thus, the rider is functioning as a shock absorber.

SUMMARY OF THE INVENTION

A first object of the present invention is to increase the time for absorption and damping of the energy imparted to energy-absorbing and damping components of a trailing arm bicycle suspension, thereby permitting the capacities of those components to be reduced and enabling the efficiency of the suspension to be increased. A second object is to uncouple a rear trailing arm suspension of a bicycle from the chain drive by maintaining a substantially constant pulling distance between the driving sprocket wheel and the driven sprocket wheel. It should be apparent that in a rear suspension, an increase in time for energy absorption and damping exacerbates the effects of the coupling of the suspension to the chain drive. Thus, achieving the first object in a rear suspension makes fulfilling the second object important.

There is provided, in accordance with the present invention, an improvement in a trailing arm bicycle suspension of the type having a wheel-supporting frame member, a swing arm mounted on the frame member to pivot about a pivot axis, and a wheel mounted on the pivot arm for rotation about a rotation axis spaced apart from, to the rear of and substantially below the pivot axis. The invention is characterized in that the pivot axis of the swing arm is located relative to the rotation axis of the wheel such that the maximum upward vertical displacement of the rotation axis relative to the pivot axis from a neutral position (rider sitting on bike, which preloads the energy-absorbing system) is accompanied by significant horizontal displacement of the rotation axis relative to the pivot axis. Inasmuch as the horizontal displacement of the rotation axis is a function of the tangent of the angle between the swing arm and the horizontal, maintaining a high horizontal displacement of the rotation axis relative to the vertical displacement requires that the swing axis form an angle with the horizontal of greater than about 20° and, preferably greater than 30°. The angle should not, however, be greater than about 70°.

Although it would be possible to provide a long swing arm having its pivot axis located high above the ground, the frame and swing arm system would have to be made unacceptably large. Accordingly, another aspect of the present invention is that a portion of the frame member and the entirety of the swing arm are located laterally of the wheel and the distance between the pivot axis and the rotation axis is substantially less than the radius of the wheel. This arrangement permits the swing arm to be short and still be inclined enough to provide a large ratio of horizontal displacement to vertical displacement of the rotation axis of the wheel.

As should be apparent from the above discussion, having a large ratio of horizontal to vertical displacement of the wheel greatly increases the time for dealing with the energy transmitted to the suspension when the bicycle goes over a raised bump. If the bump is a depression, the time for forward and downward displacement of the wheel is also increased because the wheel displaces forward as it moves down into the bump. The increased time for energy-absorption improves the efficiency of the suspension and allows lower capacity energy-absorbing and damping devices to be used.

A swing arm located on only one side of the wheel, as compared to a fork arrangement, imposes very great demands on bearings to carry high lateral torques (torques tending to skew the wheel axle relative to the rotation axis). The present invention meets that demand by mounting the pivot arm on the frame member on large diameter, thin section angular contact bearings. Such bearings, in addition to being capable of carrying high lateral torque loads, occupy only a small amount of space in the axial direction, which is of great advantage in mounting the swing arm with sufficient clearance from the rider's heel.

In a preferred embodiment, the energy-absorbing device includes a lug on the frame member spaced apart radially from the pivot axis, a lug on the swing arm spaced apart radially from the pivot axis, and a resilient element such as a metal, elastomeric or pneumatic spring, compressed between the lugs. There may be two or more such sets of lugs and springs. The damping elements may consist of a first friction ring affixed to the frame member concentric with the pivot axis and a second friction ring affixed to the swing arm concentric with the pivot axis and frictionally engaging the first friction ring. Again, several sets of friction rings can be provided.

In a preferred embodiment of a rear suspension, the drive chain is passed over an idler sheave mounted for rotation on the rear wheel support member generally below the pivot axis of the swing arm and having its circumferential support surface for the chain located such that a tangent to it is at or proximate to the pivot axis. More precisely, the optimum location of the sheave is such that the pivot centers of the chain links pass through the pivot axis of the swing arm as the chain moves past the pivot axis. The drive loads on the chain are uncoupled from movements of the rotation axis relative to the pivot axis, inasmuch as the pulling length of the chain does not change, or changes by negligible amounts, because the length of the part of the chain between the driven sprocket wheel and the sheave remains essentially constant for all displacement of the rear wheel. The distance between the driving sprocket wheel and the chain also remains substantially constant.

The swing arm may include a sleeve portion having bearing seats coaxial with the rotation axis. A wheel spindle is supported in cantilevered relation by wheel bearings received by the bearing seats. A strut is affixed to the swing arm and has a sleeve portion spaced apart along the rotation axis from the sleeve portion of the swing arm and having bearing seats coaxial with the rotation axis. A freewheel and a chain sprocket wheel set are coupled to the wheel spindle and rotatably supported on bearings mounted on bearing seats on the wheel spindle and the bearing seats on the strut. A brake disc may be affixed to the wheel spindle and can serve as a coupling between the wheel and the freewheel.

A front wheel suspension may be of essentially the same construction and function in the same way as a rear suspension. The only difference is that the front suspension does not have a freewheel or sprocket wheel set.

For a better understanding of the invention, reference may be made to the following description of an exemplary embodiments, taken in conjunction with the accompanying drawings.

DESCRIPTION OF THE EMBODIMENT

The bicycle shown in FIG. 1 incorporates several highly unique features, which include those described and shown in the following patent applications that are being filed concurrently with the present application and that are hereby incorporated by reference into the present specification:

Ser. No. 08/122,140, entitled "Monocoque Bicycle Wheel";

Ser. No. 08/122,143, entitled "Bicycle Wheel Mount";

Ser. No. 08/122,147, entitled "Bicycle Bottom Bracket/Crank Assembly";

Ser. No. 08/122,098, entitled "Bicycle Frame"; and

Ser. No. 08/122,097, entitled "Bicycle Headset."

Figure 1:
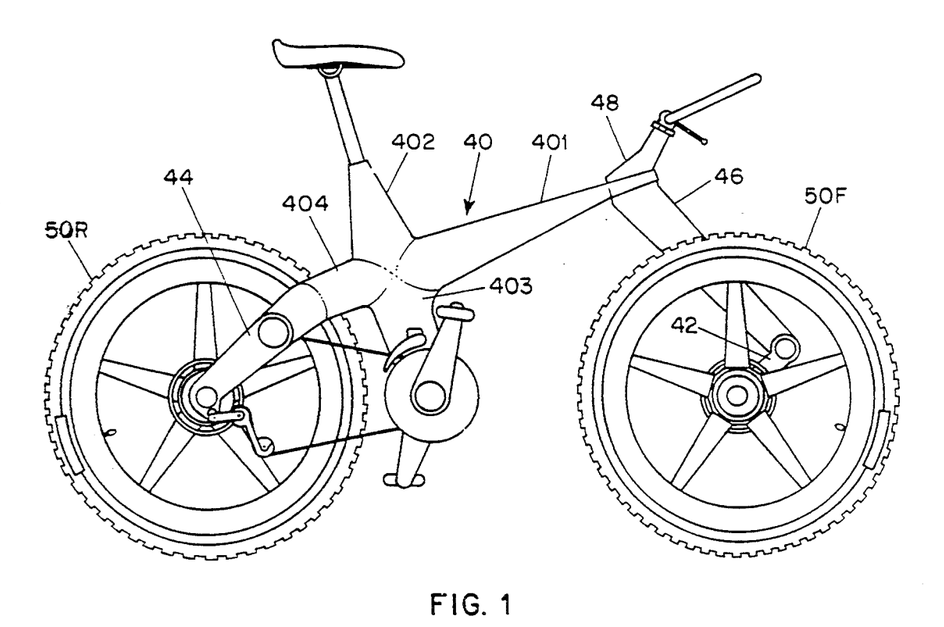
FIG. 1 is a side elevational view of a mountain bike equipped with embodiments of a front suspension and a rear suspension.

Many of the structural components of the bicycle of FIG. 1 are of monocoque construction, including the frame 40, the swing arms 42 and 44 of the wheel suspensions, the front wheel support member 46, and the handlebar support arm 48, which is affixed to the support member 46 and rotatably mounted in a collar at the front of the frame 40. The frame is generally "t"-shaped (the "t" being oriented sideways to present an inclined front leg portion 401, a seat support arm portion 402, a crank support arm portion 403 and a short, bent rear leg portion 404, to which the rear trailing arm 44 is attached. Unlike conventional bicycles, in which the wheels are carried on axles extending between members that straddle the wheels (front fork legs and rear triangles), the front and rear wheels 50F and 50R, which are of monocoque construction and may be identical, are mounted on one side of the respective swing arms 42 and 44, which permits them to be removed and replaced laterally rather than vertically. The monocoque form of the structural components of the bicycle makes them strong and rigid but permits them to be of light weight.

The present invention can be used in bikes having other forms of structural elements.

Another aspect of the construction of the bicycle is the use of thin wall, large diameter angular contact bearings in all pivot connections, including the steering headset, wheel journals, swing arm pivots, and bottom bracket/crank assembly. Those bearings allow large lateral torques to be carried without deflection and occupy a minimum of space axially, as compared with the multiple bearing sets within relatively long sleeves that are used in conventional headsets, bottom brackets and wheel journals. As used throughout the present specification, the term "thin wall large diameter angular contact bearing" refers to the following specific bearing types: a pair of axially spaced apart large diameter thin section angular contact ball bearings; a single large diameter thin section four point split inner race ball bearing; and a single large diameter thin section crossed roller bearing. A thin wall large diameter angular contact bearing resolves lateral torque loads tending to skew the supported member along vectors oblique to the axis of rotation of the member, and thus the bearing loads due to lateral torques are considerably reduced, as compared with ordinary ball bearings.

Figure 4:
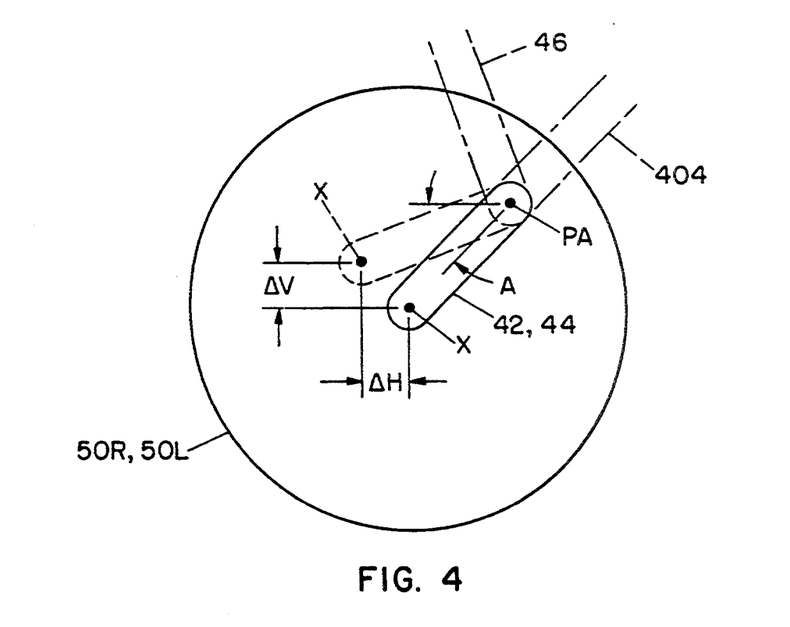
FIG. 4 is a diagrammatic side view of a suspension embodying the present invention for either a rear or a front wheel.

In a suspension according to the invention, as shown in FIG. 4, the swing arms 42, 44 are oriented at an angle A to the horizontal at a normal neutral position, i.e., with the bike horizontal and a rider seated on it, such that when the wheel rotation axis X of the swing arm 42, 44 is displaced vertically a distance $\Delta V$, it also displaces horizontally through a distance $\Delta H$. It can be shown that $\Delta H$ is a function of the tangent of angle A. The angle A should be greater than about 20° and less than about 70°. Those limits are somewhat arbitrary, there being no clear cut thresholds for the ratio of vertical to horizontal displacement. The principle of the invention is to increase the efficiency of the suspension and enable a reduction in the energy-absorbing capacity of the energy-absorbing devices. Other factors, such as frame geometry, bike weight, amount of permissible vertical displacement in the suspension and the like, influence the design. Thus, the stated limits on the relationship between vertical and horizontal displacements of the wheel axis are somewhat flexible but nonetheless indicative.

The need to keep the frame 40 compact and light in weight and to orient the swing arms 42, 44 at a comparatively large rake (angle A) virtually dictates that the swing arms be short in length. Accordingly, they and portions of the arms 46 and 404 to which they are attached lie entirely on one side of the respective wheels.

The large horizontal displacements of the wheel rotation axis of the rear suspension means that the pulling length of the drive chain would change considerably if the chain were to run directly from the driving sprocket wheel to the driven sprocket wheel, and the effect of coupling between the suspension and the drive chain would be unacceptably large. The drive is uncoupled from the suspension by providing an idler sheave 52 on the rearward end of the frame arm 404. As shown schematically in FIG. 5, the tangent to the sheave surface where the chain C runs over it is substantially at or very close to the pivot axis PA of the swing arm. Accordingly, as the swing arm pivots, there is virtually no change in the pulling length of the chain C, the length of the part of the chain between the sheave and the driven sprocket wheel 54 remaining essentially constant for all positions of the swing arm. The small change in the location of the tangent position of the chain on the sheave when the swing arm rotates is negligible. The need for the total chain length to be taken up or paid out by the chain tensioning arm of the derailleur (see FIG. 1) is reduced by one-half. More importantly, the rider is not subjected to leg force variations and is not part of the energy-absorbing system of the suspension.

Figures 5, 6:
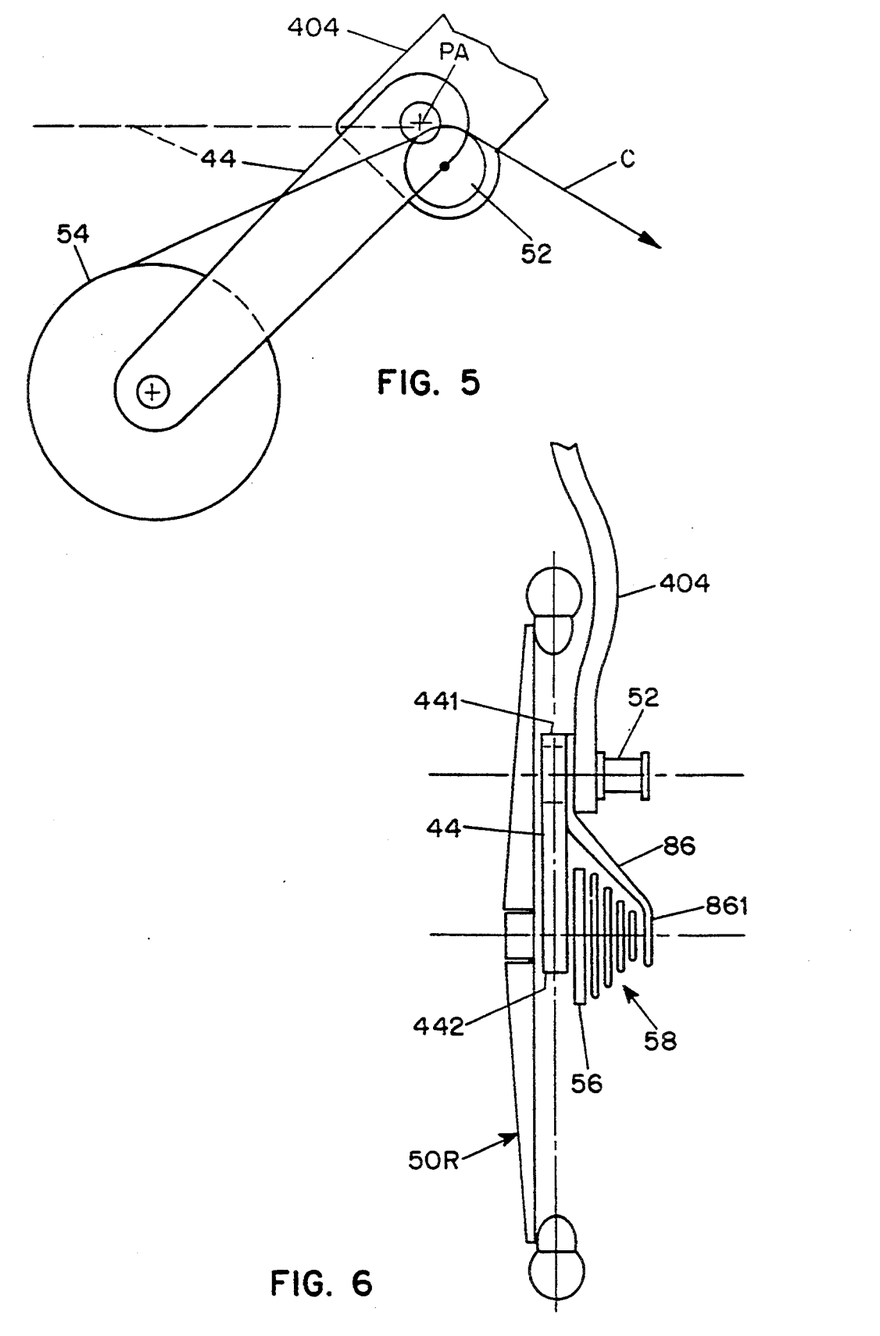
FIG. 5 is a diagrammatic side view of a rear suspension embodying the present invention.
FIG. 6 is a schematic top view of the rear suspension of the bike shown in FIG. 1.
Figure 7:
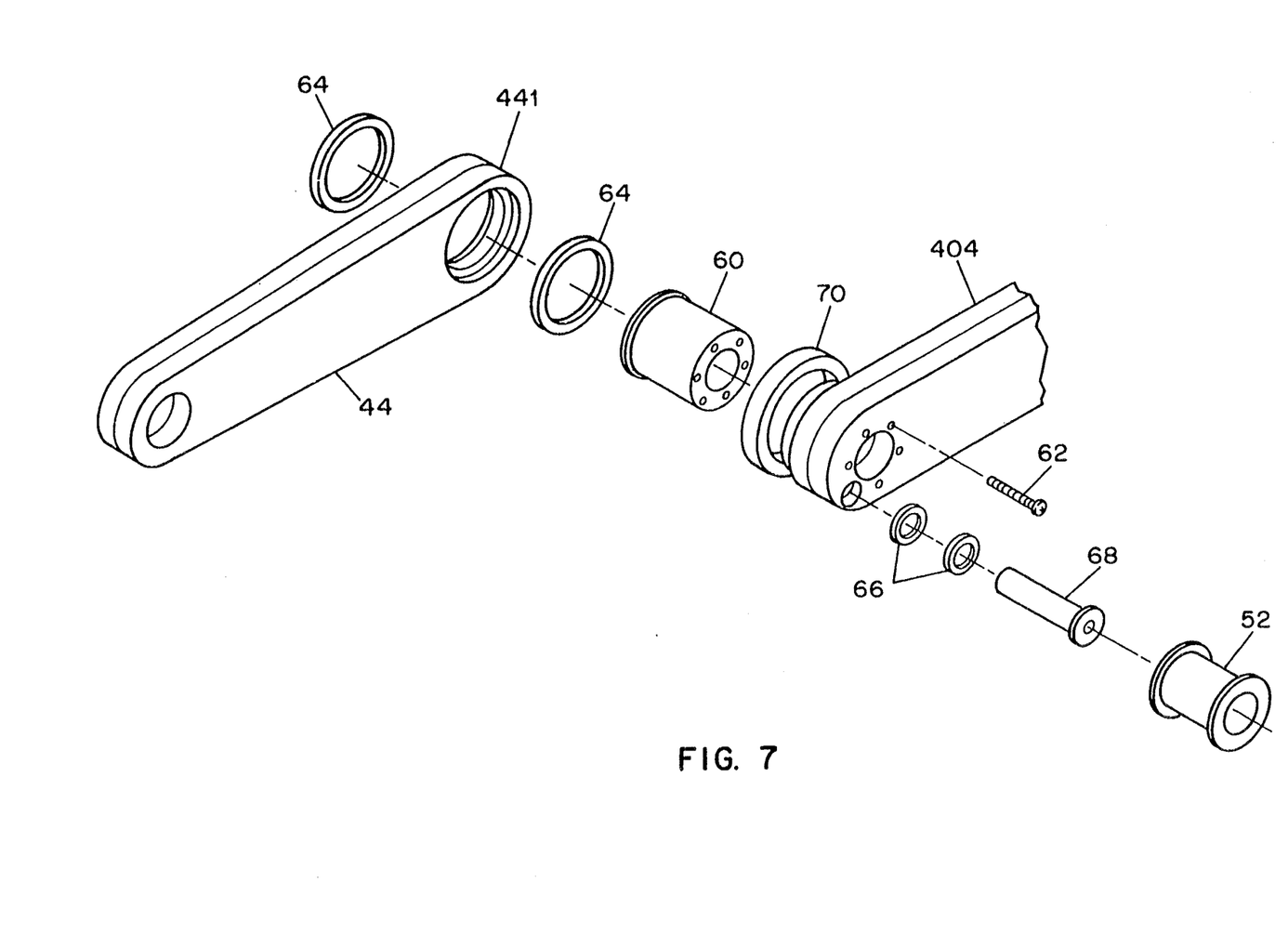
FIG. 7 is a partial exploded pictorial view of the connection between the swing arm and the frame of the suspension of FIG. 6.
Figure 8:
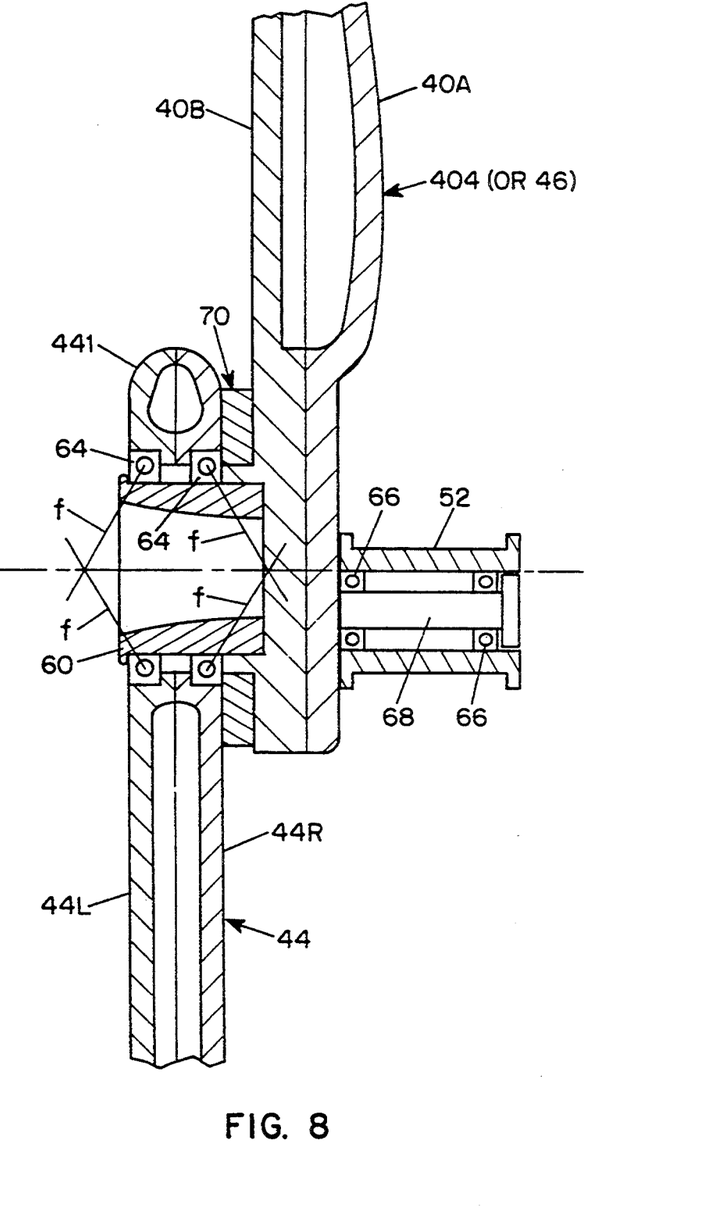
FIG. 8 is a top cross-sectional view of the connection shown in FIG. 7.

Referring to FIG. 6, the swing arm 44 not only receives the rear wheel 50R, which is journaled on one side of the rearward end of the arm, but carries a brake disc 56 and a freewheel and associated driven sprocket wheel set 58. The arrangement of the pivotal mounting of the swing arm 44 on the frame arm 404 is shown in FIGS. 7 and 8. The same arrangement is used for the front suspension, except that the idler sheave 54 and sprocket set 58 are omitted. The present description, therefore, applies to both the front and rear suspensions. As mentioned above, the frame 40 and swing arms 42, 44 are, preferably but by no means necessarily, monocoque structures, which can be manufactured in various ways. For example, they may be cast or machined (or both cast and machined) in sections, each being approximately one lateral half of the member, and then joined at their edges. The frame and other monocoque components can also be built up separately produced units and may include spars and ribs within the skins like aircraft structures. In the embodiment, the frame includes a right half member 40A and a left half member 40B (see FIG. 8). Similarly, the monocoque swing arm 44 (or 42) consists of half members 44R and 44L.

Referring to FIGS. 7 and 8, a mounting tube 60 is fastened by screws 62 to the frame arm 404 (or front wheel support arm 46) and receives a pair of large diameter, thin section angular contact ball bearings 64. The lines f indicate the resolution of lateral torques exerted by the swing arm 44 on the bearings, and it is apparent that they are capable a carrying large torques, even though they are close together. The small axial space occupied by large diameter thin section angular contact bearings makes them ideal for the pivot mountings of the swing arms, especially in the rear swing arm which has to be in clearance from the rider's heel. The outer races of the bearings 64 are received by seats within a sleeve portion 441, thereby pivotally mounting the swing arm 44 on the frame arm 404. The idler sheave 52 is supported by bearings 66 on a shaft 68 affixed to the frame arm 404.

Figure 9:
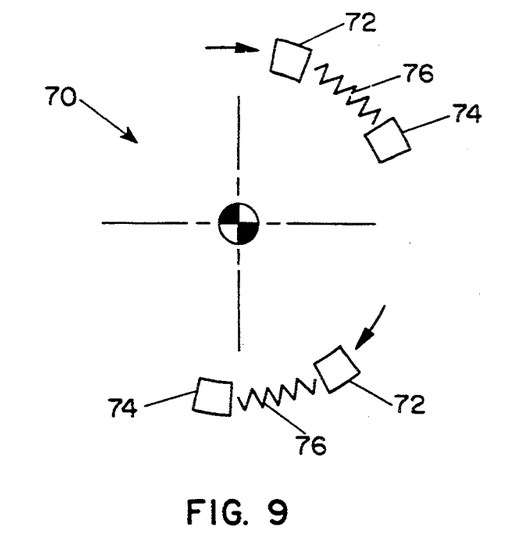
FIG. 9 is a schematic diagram of the energy-absorbing device of the suspension.

Energy absorption and damping may be provided by a linear mechanism connected between the swing arm 44 and the frame 40 in the case of the rear suspension and the swing arm 42 and the wheel support arm 46 in the case of the front suspension. A more elegant system is shown diagrammatically in FIGS. 8, 9 and 10. An annular energy absorber/damper unit 70 is interposed between the sleeve portion 441 of the swing arm and the adjacent end portion of the frame arm 404. The energy absorbing function of the unit 70 is provided by lugs 72 (see FIG. 9) that project from the face of the sleeve portion 441, each of which is paired with a lug 74 that projects from the face of the frame arm 404. Springs 76, which may be mechanical, elastomeric, or pneumatic, are interposed in compression between the paired lugs 72, 74. Limit positions may be established by stop lugs (not shown) or by the sizing and positioning of the lug pairs and springs. The damping function of the unit 70 is provided by interleaved pairs of friction rings 78, 80 (FIG. 10), one ring 78 of each pair being affixed to the frame arm 404 and the other 80 to the swing arm 44.

Figure 10:
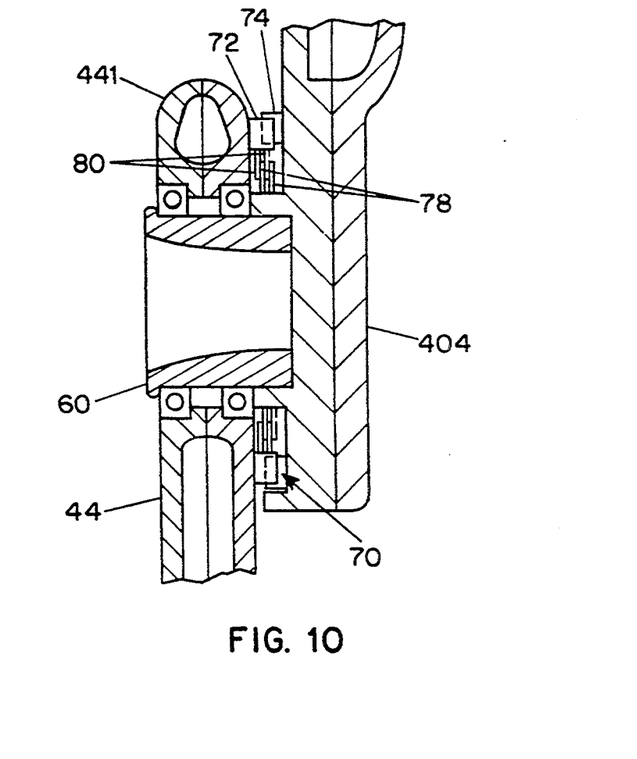
FIG. 10 is a schematic diagram of the damping device of the suspension.

The rings 78 and 80 are suitably biassed toward each other to provide a desired frictional damping of motions of the swing arm.

Figure 11:
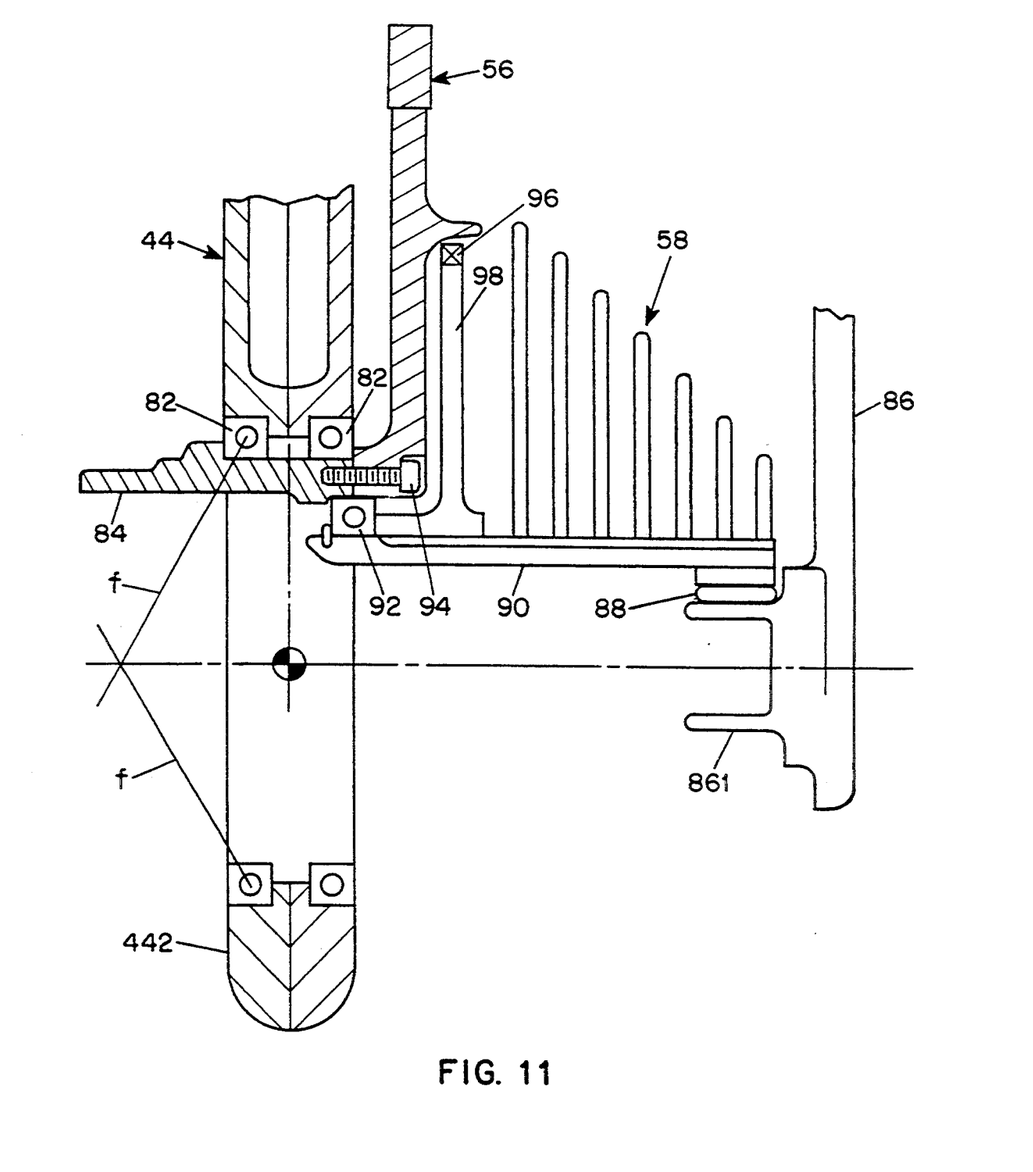
FIG. 11 is a fragmentary top cross-sectional view of the arrangement for mounting a wheel spindle, a freewheel and a sprocket wheel set on the swing arm of the rear suspension; the same arrangement, without the freewheel and sprocket wheel set is used for the front suspension.

As shown in FIG. 11, the swing arm 44 has a distal sleeve portion 442 having bearing seats coaxial with the rotation axis of the wheel that receive a large diameter, thin section angular support bearing 82. A stub spindle 84 for the wheel is supported by the bearing 82 for rotation in cantilevered relation. The wheel hub is received on and suitably affixed to the spindle 84. A strut 86 is affixed to the swing arm 44 and has a sleeve portion 861 spaced apart along the wheel rotation axis from the sleeve portion 442 of the swing arm. Bearing seats on the sleeve portion 861 receive roller bearings 88 that rotatably carry one end of a support tube 90 for the freewheel and the set of driven chain sprocket wheels 58. The inboard end of the support tube 90 is rotatably supported by a bearing 92. The brake disc 56 is fastened by screws 94 to the wheel spindle 84 and carries dogs 96 that are part of the freewheel, which has a large diameter ratchet wheel 98.

We claim:

1. A bicycle comprising a single wheel-supporting frame member, a single swing arm mounted on the frame member on large diameter thin section angular contact bearings to pivot about a pivot axis, energy-absorbing and damping devices coupled between the swing arm and the frame member, and a wheel mounted on the swing arm for rotation about a rotation axis spaced apart from, rearwardly of and substantially below the pivot axis, a portion of the frame member and the entirety of the swing arm being located laterally of the wheel, the distance between the pivot axis and the rotation axis being substantially less than the radius of the wheel, and the pivot axis being located relative to the rotation axis such that upward vertical displacements of the rotation axis relative to the pivot axis upon rotation of the swing arm from a neutral position are accompanied by substantial rearward horizontal displacements of the rotation axis so as to increase the time for response of the energy-absorbing and damping devices.

2. A bicycle according to claim 1 wherein the energy-absorbing means includes a lug on the frame member spaced apart radially from the pivot axis, a lug on the swing arm spaced apart radially from the pivot axis, and resilient means compressed between the lugs.

3. A bicycle according to claim 1 wherein the damping means includes a first friction ring affixed to the frame member concentric with the pivot axis and a second friction ring affixed to the swing arm concentric with the pivot axis and frictionally engaging the first friction ring.

4. A bicycle according to claim 1 wherein the frame member is a rear wheel support member and the wheel is a rear wheel.

5. A bicycle according to claim 4 and further comprising a drive chain coupled to the rear wheel and an idler sheave mounted for rotation on the rear wheel support member generally below the pivot axis and having a circumferential support surface for the chain located such that a tangent to it is proximate to the pivot axis, the chain being trained over the sheave support surface, whereby the drive loads on the chain are uncoupled from movements of the rotation axis relative to the pivot axis.

6. A bicycle according to claim 5 wherein the swing arm includes a sleeve portion having bearing support surfaces coaxial with the rotation axis, and further comprising a wheel spindle supported by wheel bearings received by the bearing support surfaces of the swing arm, a strut affixed to the swing arm and having a sleeve portion spaced apart from the sleeve portion of the swing arm and having bearing support surfaces coaxial with the rotation axis, and an assembly including a freewheel and a chain sprocket set coupled to the wheel spindle and rotatably supported on bearings mounted on bearing support surfaces of the wheel spindle and on the bearing support surfaces of the strut.

7. A bicycle according to claim 6 and further comprising a brake disc affixed to the wheel spindle and means on the brake disc for coupling the wheel spindle to the freewheel.

8. A bicycle according to claim 1 wherein the frame member is a front wheel support member and the wheel is a front wheel.

9. A bicycle according to claim 8, wherein the swing arm includes a sleeve portion having bearing support surfaces coaxial with the rotation axis, and further comprising a wheel spindle supported by wheel bearings received by the bearing support surfaces of the swing arm.

10. A bicycle according to claim 9 and further comprising a brake disc affixed to the wheel spindle.

11. A bicycle according to claim 1 wherein the energy-absorbing means includes a lug on the frame member spaced apart radially from the pivot axis, a lug on the swing arm spaced apart radially from the pivot axis and circumferentially from the lug on the swing arm, the lugs being spaced apart substantially equal distances from the pivot axis, and resilient means compressed between the lugs.

12. A bicycle according to claim 6 wherein the wheel bearings are large diameter thin section angular contact bearings.

13. A bicycle according to claim 9 wherein the wheel bearings are large diameter thin section angular contact bearings.

14. A bicycle according to claim 4 wherein the energy-absorbing means includes a lug on the frame member spaced apart radially from the pivot axis, a lug on the swing arm spaced apart radially from the pivot axis and circumferentially from the lug on the swing arm, the lugs being spaced apart substantially equal distances from the pivot axis, and resilient means compressed between the lugs.

15. A bicycle according to claim 4 wherein the damping means includes a first friction ring affixed to the frame member concentric with the pivot axis and a second friction ring affixed to the swing arm concentric with the pivot axis and frictionally engaging the first friction ring.

16. A bicycle according to claim 8 wherein the energy-absorbing means includes a lug on the frame member spaced apart radially from the pivot axis, a lug on the swing arm spaced apart radially from the pivot axis and circumferentially from the lug on the swing arm, the lugs being spaced apart substantially equal distances from the pivot axis, and resilient means compressed between the lugs.

17. A bicycle according to claim 8 wherein the damping means includes a first friction ring affixed to the frame member concentric with the pivot axis and a second friction ring affixed to the swing arm concentric with the pivot axis and frictionally engaging the first friction ring.

* * * * *